United States Patent [19]
Yeh

[11] Patent Number: 5,398,955
[45] Date of Patent: Mar. 21, 1995

[54] FOLDABLE BICYCLE

[76] Inventor: Ching-Tsung Yeh, No. 93, 10 Lin, Tien Hsin Li, Yuan Li Chen, Miaoli Hsien, Taiwan, Prov. of China

[21] Appl. No.: 105,717

[22] Filed: Aug. 12, 1993

[51] Int. Cl.[6] ............................................. B62K 15/00
[52] U.S. Cl. .................................... 280/287; 280/278
[58] Field of Search ...................... 280/287, 278, 281.1

[56] References Cited

U.S. PATENT DOCUMENTS

| | | | |
|---|---|---|---|
| 4,202,561 | 5/1980 | Yonkers | 280/287 X |
| 4,909,537 | 3/1990 | Tratner | 280/287 X |

FOREIGN PATENT DOCUMENTS

| | | | |
|---|---|---|---|
| 2321419 | 3/1977 | France | 280/287 |
| 1505223 | 1/1970 | Germany | 280/287 |
| 2021054 | 11/1979 | United Kingdom | 280/287 |

*Primary Examiner*—Margaret A. Focarino
*Assistant Examiner*—Carla Mattix
*Attorney, Agent, or Firm*—Watts, Hoffman, Fisher & Heinke Co.

[57] ABSTRACT

A foldable bicycle including (a) a stem tube including a first section slidably mounted in a second section pivotally linked to a third section, a handle bar mounted on the first section of the stem tube, the third section of the stem tube rotatably mounted in a head tube and (b) a top tube comprising a first section pivotally linked to a second section, the first section of the top tube fixed to the head tube, the second section of the top tube fixed to a downtube and a seat tube wherein a seat post is slidably mounted.

3 Claims, 6 Drawing Sheets

FOLDABLE BICYCLE

BACKGROUND OF INVENTION

1. Field of Invention

The present invention relates to a foldable bicycle.

2. Related Prior Art

Conventionally, each foldable bicycle has various parts pivotally linked to one another by means of a number of pivotal couplers. Although it is easy to deal with each pivotal coupler, it is troublesome to extend or fold the foldable bicycle as it involves many pivotal couplers. It is dangerous to ride the bicycle if the parts thereof are misaligned to one another. Therefore, it is desired to reduce the number of the pivotal couplers to the minimum.

SUMMARY OF INVENTION

It is an object of the present invention to provide a foldable bicycle employing a minimum number of pivotal couplers. The foldable bicycle includes (a) a stem tube including a first section slidably mounted in a second section pivotally linked to a third section, a handle bar mounted on the first section of the stem tube, the third section of the stem tube rotatably mounted in a head tube 1 and (b) a top tube comprising a first section pivotally linked to a second section, the first section of the top tube fixed to the head tube 1, the second section of the top tube fixed to a downtube 3 and a seat tube 4 wherein a seat post is slidably mounted.

For a better understanding of the present invention and objects thereof, a study of the detailed description of the embodiments described hereinafter should be made in relation to the accompanying drawings.

DETAILED DESCRIPTION OF PREFERRED EMBODIMENT

Figure 1:
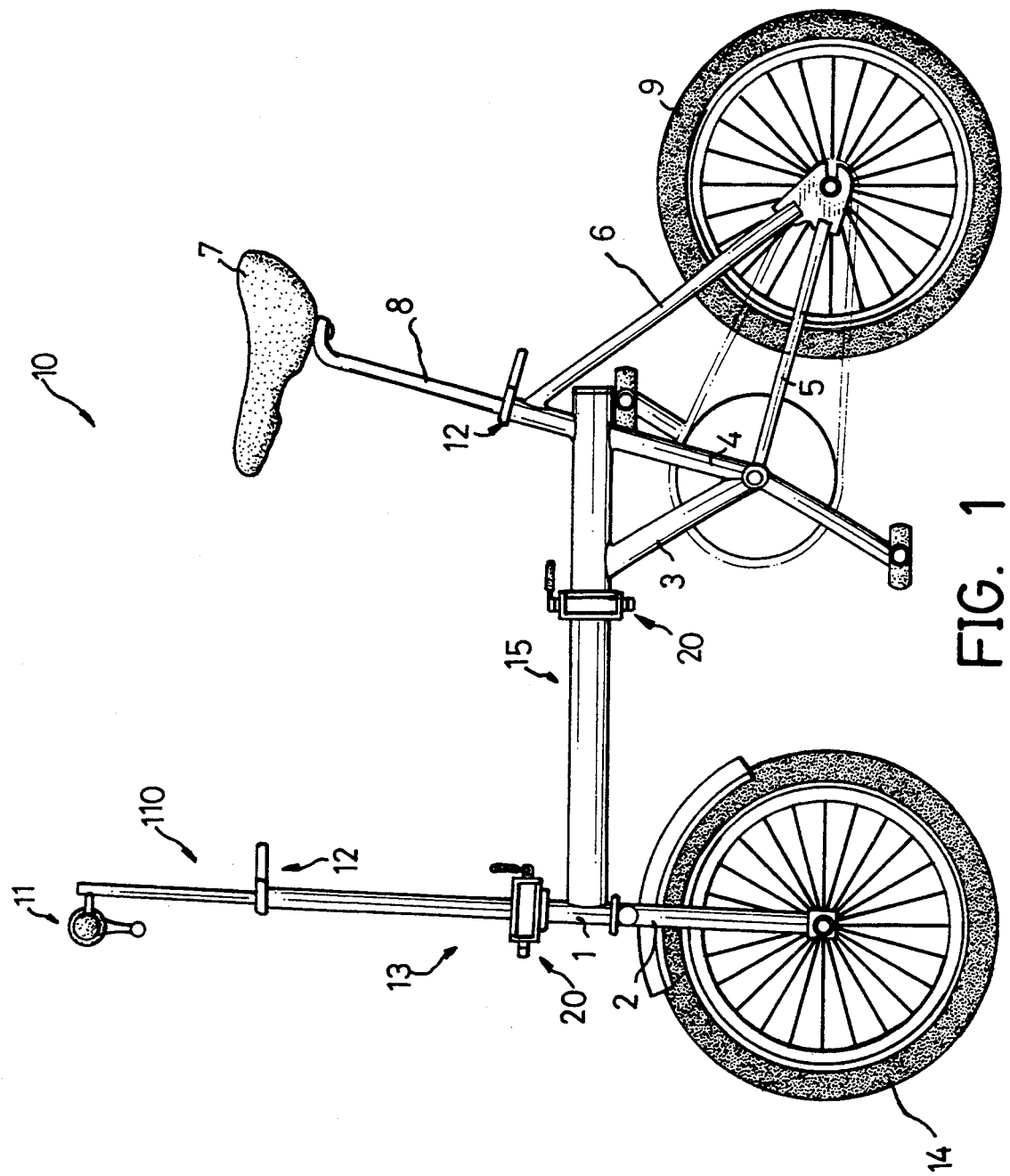
FIG. 1 is a right side view of a foldable bicycle in accordance with the present invention.

Referring to FIG. 1 of the drawings, a foldable bicycle 10 has a handle bar 11. A stem tube 13 has a first section, a second section and a third section (not shown). The handle bar 11 is mounted on the first section of the stem tube 13. The first and second sections of the stem tube 13 are arranged as a telescopic configuration, i.e., the first section of the stem tube 13 is slidable in the second section of the stem tube 13. The retraction of the first section of the stem tube 13 into the second section of the stem tube 13 is controlled by means of a quick-release clamp 12 mounted therebetween. The second section of the stem tube 13 is linked to the third section of the stem tube 13 by means of a pivotal coupler 20 which will be described later. The third section of the stem tube 13 is linked to a steering tube (not shown) in a head tube 1. The steering tube is fixed to a fork 2 to which a front wheel 14 is mounted.

A top tube 15 has a first section and a second section. The first section of the top tube 15 is linked to the second section of the top tube 15 by means of another pivotal coupler pivotal 20. The head tube 1 is fixed to the first section of the top tube 15. The second section of the top tube 15, a downtube 3 and a seat tube 4 are fixed to one another by means of welding or brazing. The seat tube 4, a chain stay 5 and a seat stay 6 are fixed to one another in a similar manner. A seat 7 is mounted on a seat post 8. The seat post 8 and the seat tube 4 are arranged as a telescopic configuration, i.e., the seat post 8 is slidable in the seat tube 4. The retraction of the seat post into the seat tube 4 is controlled by means of another quick-release clamp 12. A rear wheel 9 is mounted on a drop-out plate connecting the chain stay 5 with the seat stay 6.

Figure 2:
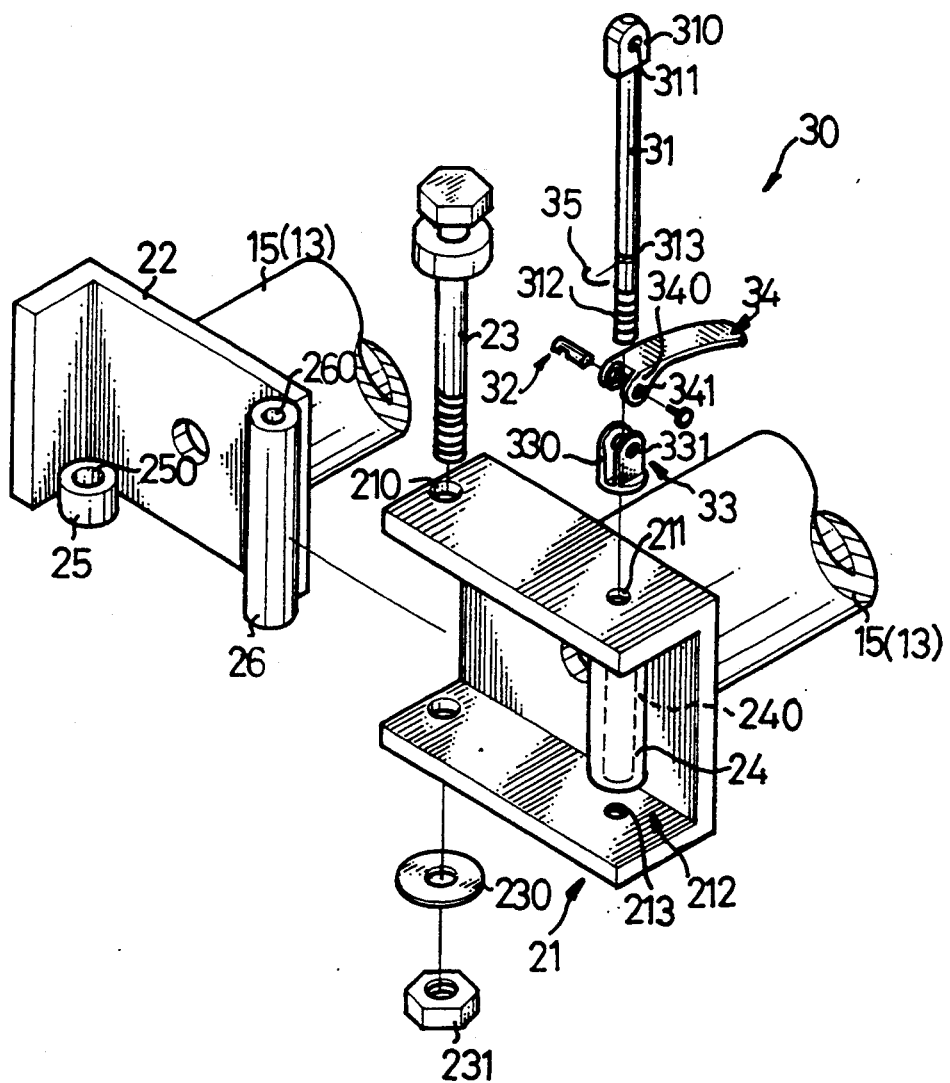
FIG. 2 is an exploded view of a first type of pivotal coupler employed by the foldable bicycle in accordance with the present invention.
Figure 3:
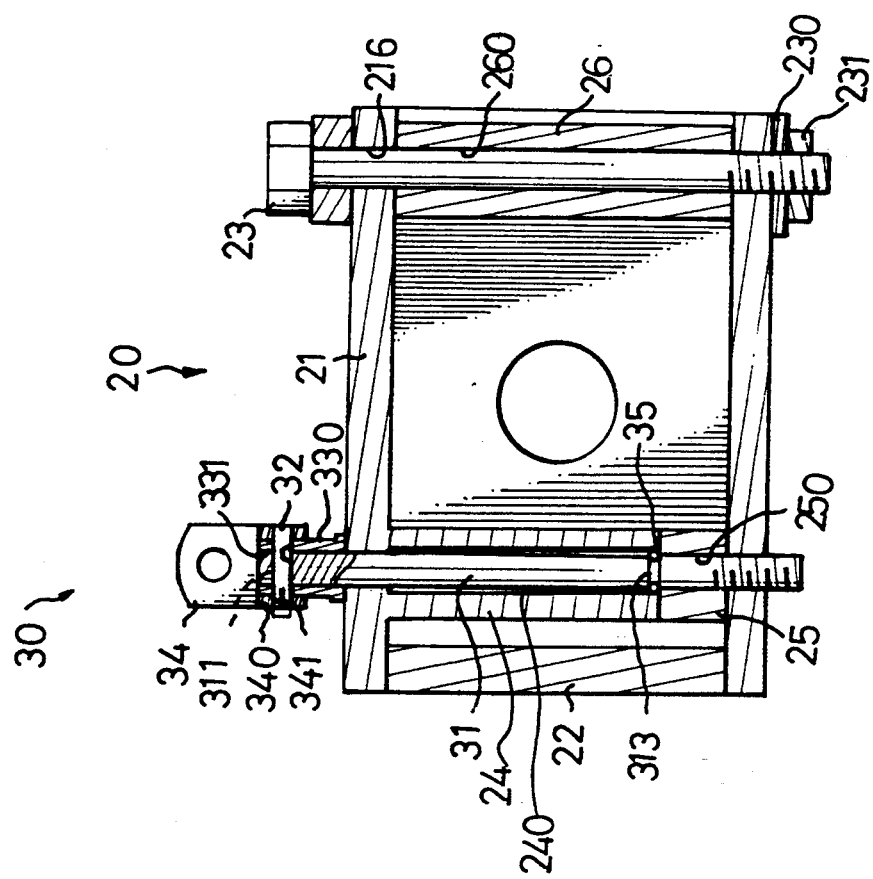
FIG. 3 is a partial cross-sectional view of the first type of pivotal coupler employed by the foldable bicycle in accordance with the present invention.

Referring to FIGS. 2 and 3 of the drawings, the pivotal coupler 20 which links the first section of the top tube 15 to the second section of the top tube 15 will be described as an example.

The pivotal coupler 20 has a bracket 21 including a flat body formed perpendicularly between a first flat portion and a second flat portion. The first and second flat portions of the bracket 21 are parallel to each other. The first section of the top tube 15 is fixed to a first side of the body of the bracket 21. Two holes 210 and 211 are formed through the first flat portion of the bracket 21. Two holes 212 and 213 are formed through the second flat portion of the bracket 21. The holes 210 and 212 have a common axis. The holes 211 and 213 have a common axis. The hole 213 defines a thread. A sleeve 24 defining a passage 240 axially formed therethrough is fixed on the underside of the upper portion of the bracket 21 so that the hole 211 communicates with the passage 240.

The pivotal coupler 20 further has a bracket 22 which includes a flat body. The second section of the top tube 15 is fixed to a first side of the flat body of the bracket 22. A sleeve 25 defining an axial passage 250 and a sleeve 26 defining an axial passage 260 are fixed on the second side of the body of the bracket 22 parallel to each other.

A bolt 23 is inserted through the hole 210, the passage 260 and the hole 212. The bolt 23 is also inserted through a washer 230 and is further threadably engaged in a nut 231. Thus, the first section of the top tube 15 is pivotally linked to the second section of the top tube 15.

A first type of quick-release device 30 is employed by the foldable bicycle in order to control the pivoting of the first section of the top tube 15 with respect to the second section of the top tube 15.

The first type of quick-release device 30 has a latch 31 including a flat head 310 having a hole 311 transversely formed therethrough, a tip 312 and an annular groove 313. The tip 312 defines a thread.

A fulcrum member 33 has a flat body defining a central hole and two ears 330 projecting from the flat body. Each of the ears 330 has a hole 331 formed therethrough.

A lever 34 has two ears 340 formed at one end thereof. Each of the ears 340 has a hole formed therethrough.

The latch 31 is inserted through the central hole formed through the fulcrum member 33 so that the head 310 is disposed between the ears 330. The ears 330 are disposed between the ears 340. An eccentric pin 32 is inserted through the holes 341, 331 and 311 so that the latch 31, the fulcrum member 33 and the lever 34 are combined. Then, two ends of the eccentric pin 32 are fixed to the ears 340 by means of welding or brazing. The latch 31 is movable between an upper position and a lower position in respect to the fulcrum member 33 by rotating the eccentric pin 32 by pivoting the lever 34. It is desired that the latch 31 is in the lower position when the lever 34 is retained about 30° above an imaginary horizontal line and in the upper position when the lever 34 is substantially retained horizontally.

The latch 31 is further inserted through the hole 211 and the passage 240. The annular groove 313 is engaged with a C-clip 35. The diameter of the hole 211 is less than that of the passage 240. The diameter of the passage 240 is marginally greater than that of the C-clip 35. Thus, the latch 31 is slidable in the sleeve 24, but is not detachable from the bracket 21.

Referring to FIG. 3, the sleeve 24 aligns with the sleeve 25 as the first and second sections of the top tube 15 align with each other when the foldable bicycle is in an extended position as shown in FIG. 1. To retain the foldable bicycle 10 in the extended position, the latch 31 is further inserted through the passage 250. The tip 312 is threadably engaged in the hole 213 by rotating the lever 34 retained about 300° above the imaginary horizontal line. The tip 312 is further secured in the hole 213 by moving the latch 31 to the upper position by rotating the eccentric pin 32 by pivoting the lever 34 in a direction.

Figure 4:
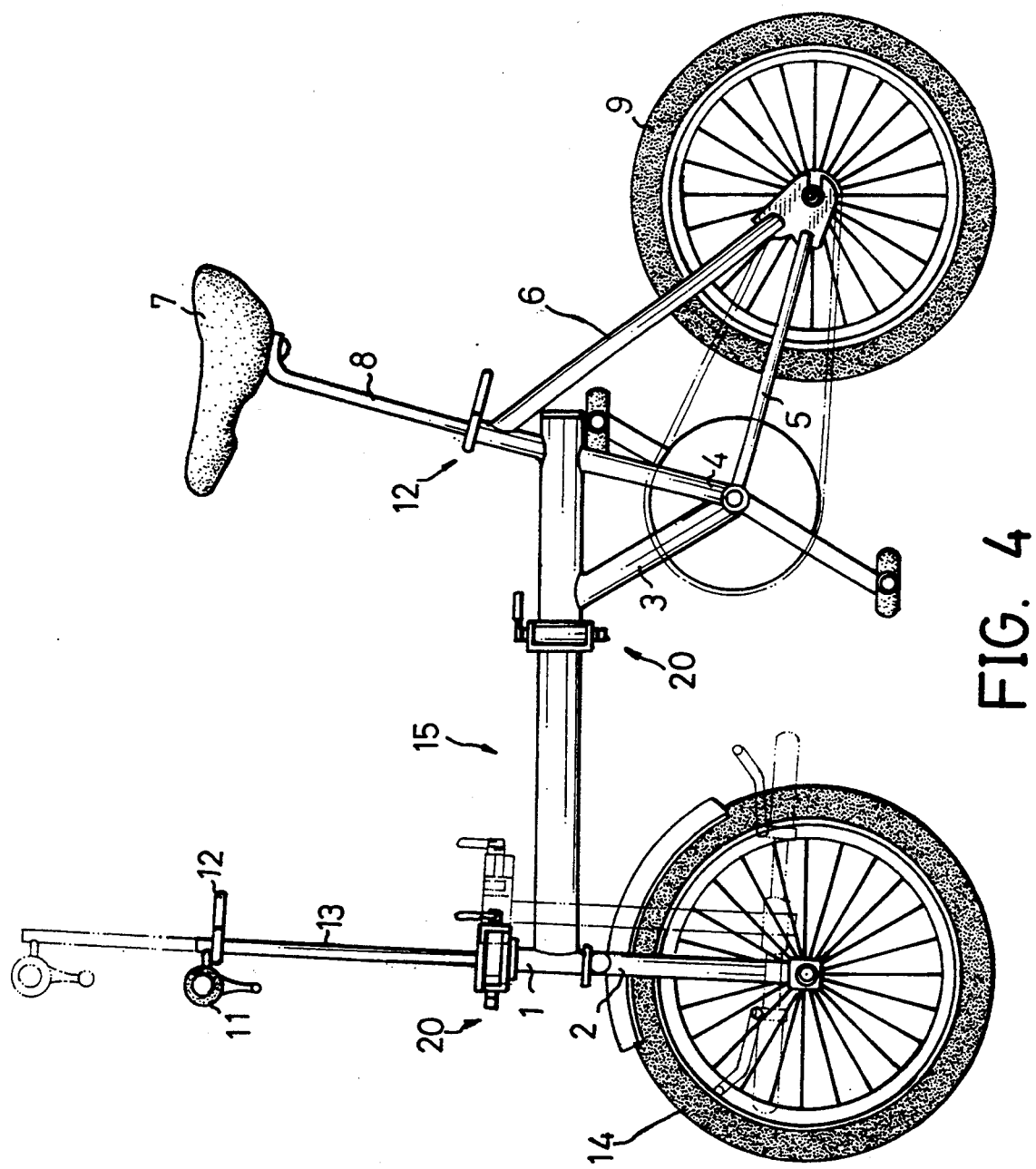
FIG. 4 is a right side view of a foldable bicycle including a stem tube including a first section retracted in a second section in accordance with the present invention.

Referring to FIG. 4, the first section of the stem tube 13 is retracted into the second section of the stem tube 13. The second section of the stem tube 13 is pivoted so as to be parallel to the third section of the stem tube 13.

Figure 5:
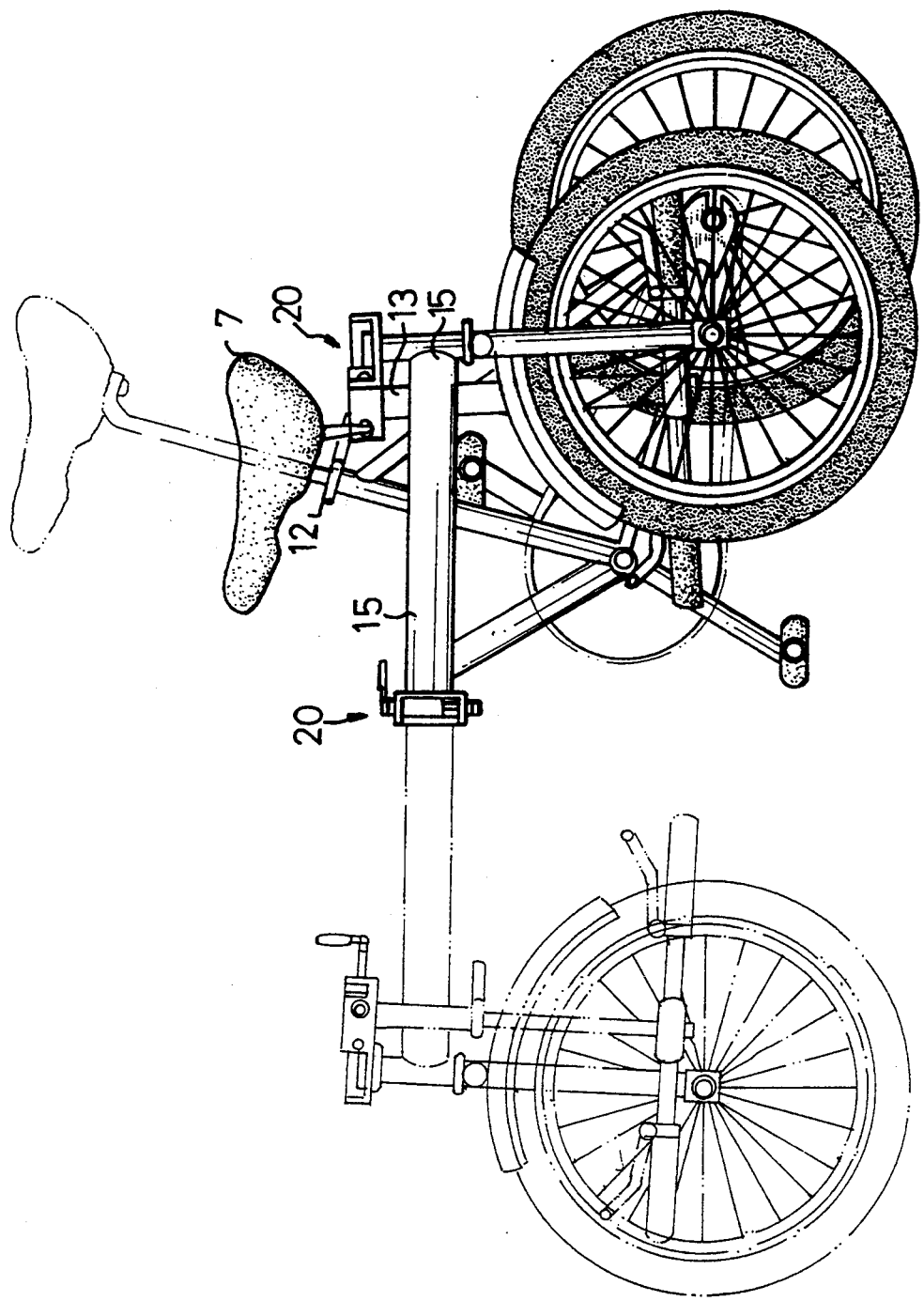
FIG. 5 is a right side view of a foldable bicycle in a folded position according to the present invention.

Referring to FIG. 5, the first section of the top tube 15 is pivoted so as to be parallel to the second section of the top tube 15. The seat post is retracted into the seat tube 4. Thus, the bicycle 10 is moved to a folded position.

Figure 6:
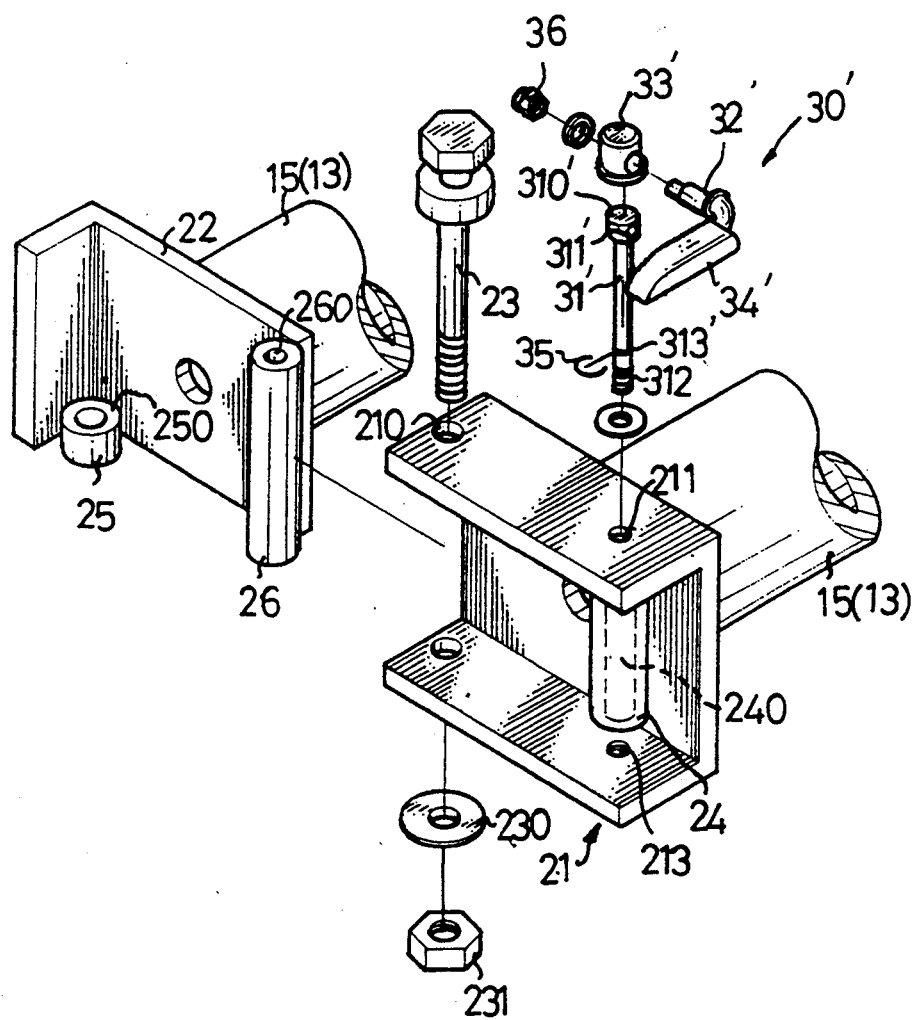
FIG. 6 is an exploded view of a second type of pivotal coupler employed by the foldable bicycle in accordance with the present invention.

Referring to FIG. 6, a second type of quick-release device 30' has a latch 31' including a head 310' transversely through which a hole 311' is formed, a tip 312' on which a thread is formed and an annular groove 313' formed therein. A fulcrum member 33' is formed as a cap transversely through which two opposite holes are formed. An a eccentric pin 32' and a lever 34' are formed as an L-shaped element. The head 310' is received in the fulcrum member 33'. The eccentric pin 32' is inserted through the holes formed through the fulcrum member 33' and the hole 311'. The tip of the eccentric pin 32' is threadably engaged in a nut 36. The latch 31', eccentric pin 32', the fulcrum member 33' and the lever 34' are combined. The latch 31' is further inserted through the hole 211 and the passage 240. The C-clip 35 is engaged in the groove 313'. The second type of quick-release device 30' acts in a similar manner to the first type of the quick-release device 30 and, therefore, further details thereof will not be given.

Obviously, the foldable bicycle 10 in accordance with the present invention achieves a sufficiently small space for the storing thereof with only two pivotal couplers 20. Further, it takes a shorter time to fold/extend the foldable bicycle 10 than to fold/extend any conventional one.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A foldable bicycle comprising:
   a) a stem tube comprising first, second and third sections, said first stem tube section being slidably mounted in said second stem tube section;
   b) a pivotal coupler, the coupler pivotally linking the second stem tube section to said third stem tube section;
   c) a handle bar mounted on said first stem tube section;
   d) a head tube, said third stem tube section being rotatably mounted in the head tube; and,
   e) a second pivotal coupler, a top tube having a first top tube section pivotally linked to a second top tube section by the second coupler, said first top tube section being fixed to said head tube,
   f) a down tube and a seat tube, said second top tube section being fixed to the down and seat tubes,
   g) a seat post slidably mounted on the seat tube;
   h) said second pivotal coupler comprising:
      i) a first bracket including a flat body having a first side fixed to the first section of said top tube;
      ii) the first bracket having first and second flat portions formed on a second side thereof;
      iii) a sleeve extending from said first flat portion towards said second flat portion;
      iv) said first flat portion defining a first hole and a second hole;
      v) said second flat portion defining a first hole and a second hole;
      vi) a second bracket including a flat body having a first side, said second section of said top tube being fixed to the first flat body side;
      vii) the second bracket having a second side;
      viii) a first sleeve and a second sleeve fixed to the second side of the second bracket;
   i) a fastener extending through said first holes and pivotally linking said second bracket to said first bracket; and
   j) a quick-release device comprising a latch insertable through said first bracket second hole, the first bracket sleeve and said second bracket first sleeve, for retaining said pivotal coupler in a locked position.

2. A foldable bicycle in accordance with claim 1, wherein:
   said second hole formed through said second flat portion of said first bracket has a thread formed thereon; and
   said quick-release device further comprises:
      a latch comprising a flat head defining a hole, a tip defining a thread and an annular groove formed therein,
      a fulcrum member comprising a central hole formed therethrough and two ears formed thereon, each of said ears comprising a hole formed therethrough;
      a lever comprising two ears formed thereon, each of said ears comprising a hole formed therethrough;
      an eccentric pin; and a C-clip comprising an outer diameter being marginally less than the inner diameter of said sleeve of said first bracket but greater than the diameter of said second hole formed through said first flat portion of said first bracket;

said latch inserted through said central hole formed through said fulcrum member, said second hole formed through said first flat portion of said first bracket and said sleeve of said first bracket, said annular groove engaged with said C-clip so that said latch is restrained slidably in said sleeve of said first bracket;

said head of said latch disposed between said ears of said fulcrum member disposed between said ears of said lever, said eccentric pin inserted through said holes formed through said ears of said lever, said holes formed through said ears of said fulcrum member and said hole formed through said head of said latch and fixed to the ears of said lever;

said latch further insertable through said first sleeve of said second bracket, said thread formed on said tip of said latch engaged in said second hole formed through said second flat portion of said first bracket by rotating said lever about said latch;

said thread formed on said tip of said latch more firmly engaged with said thread formed in said second hole formed through said second flat portion of said first bracket by pulling said latch from said second flat portion of said fulcrum member towards said first flat portion of said fulcrum member by pivoting said lever about said eccentric pin.

3. A foldable bicycle in accordance with claim 1, wherein:

said second hole formed through said second flat portion of said first bracket comprises a thread formed thereon; and said quick-release device further comprises:

a latch comprising a flat head defining a hole, a tip defining a thread and an annular groove formed therein, a cap-shaped fulcrum member comprising two opposite holes formed therethrough;

a lever transversely formed together with an eccentric pin; and a C-clip comprising an outer diameter being marginally less than the inner diameter of said sleeve of said first bracket but greater than the diameter of said second hole formed through said first flat portion of said first bracket;

said latch inserted through said second hole formed through said first flat portion of said first bracket and said sleeve of said first bracket, said annular groove engaged with said C-clip so that said latch is restrained slidably in said sleeve of said first bracket;

said head of said latch disposed in said cap-shaped fulcrum member, said eccentric pin inserted through said opposite holes formed through said cap-shaped fulcrum member and said hole formed through said head of said latch and fixed to said ears of said lever;

said latch further insertable through said first sleeve of said second bracket, said thread formed on said tip of said latch engaged in said second hole formed through said second flat portion of said first bracket by rotating said lever about said latch;

said thread formed on said tip of said latch more firmly engaged with said thread formed in said second hole formed through said second flat portion of said first bracket by pulling said latch from said second flat portion of said fulcrum member towards said first flat portion of said fulcrum member by pivoting said lever about said eccentric pin.

* * * * *